US012656845B2

(12) United States Patent
Freeman et al.

(10) Patent No.: US 12,656,845 B2
(45) Date of Patent: Jun. 16, 2026

(54) ADAPTIVE MULTI-CHANNEL SEQUENCER FOR POWER MANAGEMENT INTEGRATED CIRCUIT

(71) Applicant: NXP USA, Inc., Austin, TX (US)

(72) Inventors: Daniel James Freeman, Chandler, AZ (US); Joaquin Alberto Romo Torres, Chandler, AZ (US); Michael Erik Lundahl, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 141 days.

(21) Appl. No.: 18/807,618

(22) Filed: Aug. 16, 2024

(65) Prior Publication Data

US 2026/0050305 A1     Feb. 19, 2026

(51) Int. Cl.
*G06F 1/00* (2006.01)
*G06F 1/26* (2006.01)

(52) U.S. Cl.
CPC ...................................... *G06F 1/26* (2013.01)

(58) Field of Classification Search
CPC ....................................................... G06F 1/26
See application file for complete search history.

(56) References Cited

U.S. PATENT DOCUMENTS 11,054,878 B2 * 7/2021 Wang ..................... G06F 1/3243
12,086,015 B2 * 9/2024 Rowley ................. G06F 1/3296

| 2011/0022859 | A1 | 1/2011 | More et al. | |
|---|---|---|---|---|
| 2020/0210079 | A1 * | 7/2020 | Cho | G06F 3/0634 |
| 2022/0078863 | A1 * | 3/2022 | Gupta | G06F 9/54 |
| 2023/0009061 | A1 * | 1/2023 | Shim | G11C 16/30 |
| 2023/0065469 | A1 * | 3/2023 | Zou | H02M 3/1584 |
| 2023/0168727 | A1 | 6/2023 | Wallinger et al. | |
| 2024/0310888 | A1 * | 9/2024 | Keskin | G06F 1/263 |

OTHER PUBLICATIONS

Jianbin, Xue et al., "Anti-collision algorithm based on counting mechanism and multi-state binary", 2013 Fifth Conference on Measuring Technology and Mechatronics Automation, 2013, pp. 276-282, IEEE, Hong Kong, China.
NXP Semiconductors, PF8100; PF8200, 12-channel power management integrated circuit for high performance applications, Product data sheet, Feb. 24, 2021, Rev. 11, 133 pages.

* cited by examiner

*Primary Examiner* — Xuxing Chen

(57) ABSTRACT

A PMIC includes a controller configured to determine, based on a configuration stored in the memory, a power on mode, when the power on mode indicates a dynamic power on operation, execute the dynamic power on operation by: determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, and while monitoring the first channel, determining, of the plurality of channels, a second channel associated with a second dynamic sequence number of the plurality of dynamic sequence numbers, when the power on mode indicates a time based power on operation: iterating a slot counter through the plurality of slot numbers.

20 Claims, 6 Drawing Sheets

ADAPTIVE MULTI-CHANNEL SEQUENCER FOR POWER MANAGEMENT INTEGRATED CIRCUIT

FIELD

The present disclosure relates to power management in electronic circuits and to a power management integrated circuit for use in an electronic device.

BACKGROUND

Power management integrated circuits (PMICs) are devices configured to manage the supply of electrical energy to different components of an electronic device. In a vehicle platform, for example, a PMIC may be provided to manage the provision of electrical energy to various vehicle subsystems, such as components of an automotive infotainment system, vehicle safety systems (e.g., vehicle radar systems and telematics), and the like, and other components such as sensors, communication interfaces, and other devices. PMICs may find applications in other types of electronic devices such a mobile devices, industrial equipment, and other devices that require electrical energy management and, particularly, reliable supply of electrical energy at different voltages, which can operate as supplies to different components of the electrical devices.

SUMMARY

This summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

In some aspects, the techniques described herein relate to a power management integrated circuit, including: a power supply input terminal; a plurality of power supply output terminals, wherein each power supply output terminal in the power supply output terminals is associated with a channel of a plurality of channels; a memory configured to store configuration data that identifies, for each channel in the plurality of channels, a slot number of a plurality of slot numbers and a dynamic sequence number of a plurality of dynamic sequence numbers; and a controller configured to: receive a control input indicating that a power on operation is to be executed; determine, based on a configuration stored in the memory, a power on mode; when the power on mode indicates a dynamic power on operation, execute the dynamic power on operation by: determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, and while monitoring the first channel, determining, of the plurality of channels, a second channel associated with a second dynamic sequence number of the plurality of dynamic sequence numbers, when the power on mode indicates a time based power on operation: iterating a slot counter through the plurality of slot numbers; and when a current value of the slot counter is equal to a slot number associated with a third channel of the plurality of channels in the configuration data, enable the third channel.

In some aspects, the techniques described herein relate to a power management integrated circuit, including: a power supply input terminal; a plurality of power supply output terminals, wherein each power supply output terminal in the power supply output terminals is associated with a channel of a plurality of channels; a memory configured to store configuration data that identifies, for each channel in the plurality of channels, a slot number of a plurality of slot numbers and a dynamic sequence number of a plurality of dynamic sequence numbers; and a controller configured to execute a dynamic device power up operation by: determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, while monitoring the first channel, determining, of the plurality of channels, a second channel associated with a second dynamic sequence number of the plurality of dynamic sequence numbers, determining that the first channel is in the first regulated state, and enabling the second channel.

In some aspects, the techniques described herein relate to a method, including: determining, of a plurality of channels of a power management integrated circuit, a first channel associated with a first dynamic sequence number in a memory of the power management integrated circuit, wherein the first dynamic sequence number is a lowest dynamic sequence number of a plurality of dynamic sequence numbers, enabling the first channel, monitoring the first channel to determine whether the first channel is in a first regulated state that specifies a voltage value, while monitoring the first channel, determining, of the plurality of channels, a second channel associated with a second dynamic sequence number of the plurality of dynamic sequence numbers, determining that the first channel is in the first regulated state, and enabling the second channel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
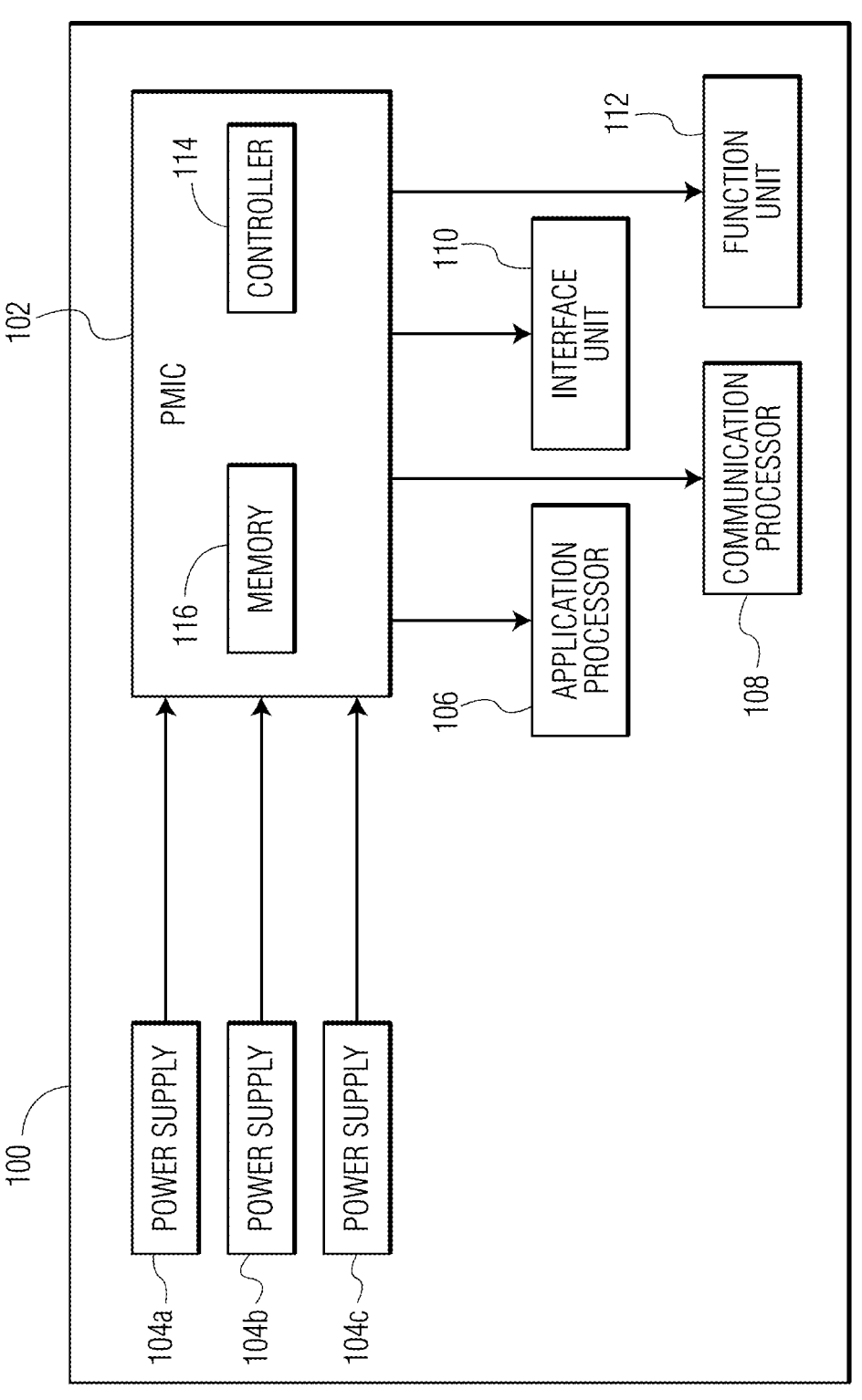
FIG. 1 is a circuit diagram depicting an electrical device including a power management integrated circuit.

The present disclosure relates to power management in electronic circuits and to a power management integrated circuit (PMIC) for use in an electronic device. PMICs are circuits configured to manage the supply of electrical energy to various components of an electrical device. A PMIC is configured to generate output signals on various channels, where the signals output at each channel may have different electrical characteristics, such as different voltages. These various signals can then, in turn, be supplied to different components of a device that may require different power supply signals for their respective operation.

For example, a PMIC that comprises part of a vehicular electrical system could generate different power supply signals at different output channels that could be used to supply electrical energy to the vehicle's entertainment system at one voltage, the vehicle's radar system at another voltage, and to the vehicle's telematics system at yet another voltage.

In many cases, it is desirable within a particular electronic device to power up the device's various components in a particular sequence. That sequence should, for each of the channels of the PMIC being utilized, allow each channel to reach its designated regulation voltage before another channel is enabled and other components are powered up. In a similar manner, when the device transitions from a power on state to a power off state, the PMIC can be configured to implement a particular power down sequence in which the PMIC's channels are disabled in a predetermined sequence (in many cases a reverse of the order in which the slots were enabled) to allow for a proper power off sequence for the device. In some cases, PMICs can be utilized to manage electric energy supply to device components as part of other power state transitions, such as when the device transitions from a standby state to either a power on or power off state, and vice versa.

In typical applications, the various channels of a particular PMIC may be utilized to provide various functionality, including providing the electrical energy to enable a particular device component to operate (e.g., as in a power supply signal), or to energize particular input/output (IO) channels of a device, enabling monitoring operations, and the like.

In providing that functionality, the enabling and disabling of set of channels of a PMIC may require precise sequencing during a device's power-up and/or power-down transitions to allow for the proper operation of the various device components and subsystems being powered and controlled by the PMIC. This precise sequencing may further provide predictability to allow multiple, otherwise-independent, PMICs to operate in parallel to create larger and more scalable power architectures for various systems and applications.

Due to the diversity of the devices and applications in which PMICs may be utilized, it can be beneficial for a PMIC to provide a high level of flexibility, particular in the manner in which different PMIC channels are enabled and disabled to implement a desired power up or power down sequence. This flexibility can enable the PMICs to satisfy different requirements depending on the application and particular operating conditions for each application or device in which the PMIC operates. Such requirements can prioritize speed, confirmed channel or slot availability, and timing compatibility across platforms among many other elements.

To address these needs, a highly configurable PMIC can provide various dynamic sequencing strategies enabling particular device channels to be enabled and confirmed as available (i.e., fully powered-up and regulated) before other PMIC channels are enabled. Such a PMIC may enable, for example, a time-based power up sequence options in which the timing sequence in which particular channels are enabled is controlled according to a predetermined timing schedule. In such a fixed-sequence or fixed-timing implementations, the device's power on procedure, for example, may require the PMIC to iterate at a predetermined rate through a number of time slots (or just "slots") (e.g., up to around 100 or more slots) where particular output channels are designated as been enabled in particular slots. As the PMIC iterates through the available slots, the PMIC determines which channels are enabled in which slots and, when the PMIC reaches a slot with associated channels, those channels are enabled at that time. As such, by associating PMIC channels using particular slot numbers, a fixed timing sequence can be defined that specifies in what order and at what time in the sequence certain channels should be enabled during a power on operation. A similar sequence can be defined (typically a reverse of the power on sequence) that specifies the sequence and timing in which channels are disabled during a power down operation by iterating through the slots in a reverse order.

In contrast to the fixed time-based sequencing described above, the present PMIC can be configured to additionally implement "dynamic" sequencing in which channels are enabled in a predetermined order, but instead of being enabled according to a predetermined timing schedule, the channels are enabled sequentially based on when a previous channel has been fully enabled and has reached that channel's regulated voltage. This dynamic approach, therefore, will still enable channels in a predetermined order, but proceeds through the sequence of channels to be enabled in the predetermined order as quickly as possible.

In the present PMIC, this dynamic sequencing approach can be an important capability during device power-up. However, during device power down, it can, in some circumstances be advantageous to use the time-based strategies that are capable of providing sufficient discharge time for proper channel disablement.

To provide this functionality, the present PMIC is configured to use a register configuration (e.g., a memory structure stored in a memory of the PMIC) per channel to determine a default slot base sequencing scheme that can be used to calculate a turn-on sequence for improved dynamic power up sequencing.

The present PMIC may utilize an algorithm to determine the order in which various channels are enabled (e.g., via the generation of channel "enable" signals) during device power-up, state-to-state transitions, or power-down transitions. As described herein, this sequencing scheme is configurable and can combine aspects of a time-based and dynamic channel selection processes for a state transition sequences (e.g., power-up sequences) comprising N channels. In various embodiments, such a PMIC may be configured to control the operation of about 16 channels, or, more generally, 2 to 20 channels. It is contemplated that various PMICs could be implemented that utilize a different number of channels depending upon the particular system or device application. The PMIC may be configured to implement and a number of slots (e.g., 100-500 slots or, in some cases, 255 slots).

The present PMIC is thereby configured to provide reduced or minimum latency when executing a power up routine because, though the described dynamic sequencing, the power up routine may avoid the relatively large dead-times associated with unused slots in the conventional time-based PMIC device power up procedure. As described herein, this can result in high availability and predictability of the power-up behavior, which may further enable power-up and power down synchronization across multiple PMIC devices in a particular application.

In many PMIC implementations, the number of available channels is smaller than the number of available slots. Accordingly, if the present PMIC is configured in its dynamic mode of operation, as described below, large numbers of unused slot (referred to as "gaps") can be skipped in a relatively short period of time to achieve back-to-back power up of non-adjacent channels. As described below, in the present PMIC, this capability can be achieved by the PMIC implementing a binary search algorithm of in-use channels to determine which of the channels still to be enabled has the smallest slot value.

In the present disclosure, the binary search algorithm can be executed by the PMIC while a previous channel is being fully powered-up (i.e., during ramp up). As such, by the time this previous channel is fully powered-up and reaches its desired regulation voltage, the PMIC, via that parallel execution of the search algorithm, will have already identified the next slot value in the sequence (i.e., the next slot that is associated with a channel to be enabled). The channels associated with that slot can then be enabled without delay following the prior channel achieving the regulated state. This can allow for a device power-up sequence with no or minimum delay between the enablement and regulation of one channel and the enabling of the next channel in the sequence. In some cases, a channel reaching a fully regulated condition may require that the channel achieve a particular set of conditions, including achieving a particular desired voltage followed by a delay allowing the voltage of the channel to settle, or, in the case of the channel implementing an input/output operation, the channel may be determined to have achieved regulation once the channel has been related and its input buffer having been set to a high value.

In various embodiments, the present PMIC can allow for a change in slot value of any channel between power-up and power-down transitions. As a result, the starting point of the power-down sequence may not be known prior to shutdown. The power-down sequencing therefore may involve the determination of the highest slot value with an associated channel, which can be achieved by taking the is compliment of the slot values for each channel (essentially inverting all the slot values) and the power down operation can be implemented.

FIG. 1 is a circuit diagram depicting an electrical device 100 including a power management integrated circuit 102. Device 100 includes one or more power supplies 104a-104c, which may include batteries, A/C power sources, or other supplies of electrical energy. Device 100 includes a number of components, including application processor 106, communication processor 108, interface units 110, and specific function unit 112. Each of the components is connected to PMIC 102 so that PMIC 102 can supply electrical energy, through one or more of its available channels, to the various components.

In FIG. 1, only power supply connections are shown between PMIC 102 and the various components 106, 108, 110, and 112, although other connections, such a control signal or data connections could exist. PMIC 102 is connected to the one or more power supplies 104a-104c. PMIC 102 is configured to utilize the various power supplies 104a-104c to generate output electrical supply signals that can be supplied to each of components 106, 108, 110, and 112.

To enable proper operation of device 100, PMIC includes controller 114 and memory 116. Memory 116, as described herein, may include a number of registers configured to store data indicative of a particular sequence in which the output channels of PMIC 102 should be enabled and/or disabled in various state transitions, such as a power up operation or power down operation.

In device 100, power sources 104a-c may include combinations of a main battery, a back-up battery, battery chargers, or A/C electrical sources. PMIC 102 is configured to use one or more of power supplies 104a-104c to generate regulated power supply signals useable by the various components of device 100. This may involve controller 114 operating PMIC 102 to generate power supply signals suited for different power domains (e.g., at different voltages) for use by device 100's various components.

In an embodiment of PMIC 102, memory 116 is configured to store a table that indicates, for each one of the channels of PMIC 102, a slot number at which the channels should be enabled as part of a power up operation and, conversely, slot numbers identifying when the channels should be disabled as part of a device power down operation. These values are used when PMIC 102 is implementing a time-based power up or power down operation. Additionally, in accordance with the present disclosure, memory 116 also stores, for each channel, values (e.g., 4-bit or 8-bit digital values) that indicate, when PMIC 102 is performing a dynamic power up operation, the order in which particular channels should be enabled as part of that dynamic process.

An example of the data stored by memory 116 is illustrated by Table 1, below.

TABLE 1

| Channel | Dynamic Sequence Number | Sequenced Power up/Down Slot | Dynamic Hierarchical level |
|---|---|---|---|
| REG1 | 0000_0010 | Slot 1 | Level 1 |
| REG2 | 0000_0100 | Slot 3 | Level 2 |
| REG3 | 0000_1000 | Slot 7 | Level 4 |
| REG4 | 0000_0111 | Slot 6 | Level 3 |
| REG5 | 0000_1011 | Slot 10 | Level 5 |
| GPIO1 | 0000_1011 | Slot 10 | Level 5 |
| GPIO2 | 0000_0010 | Slot 1 | Level 1 |
| GPIO3 | 0000_0000 | OFF | OFF |
| RSTB | 0000_1101 | Slot 12 | Level 6 |

In Table 1, the first column identifies particular channels of PMIC 102, which may include regulated voltage ("REG") channels and input/output ("GPIO") channels. The second column identifies, for the designated channel, a value indicative of the order in which that channel should be enabled as part of a dynamic power up operation. The third column designates, for each channel, the slot number at which the corresponding channel should be enabled or disabled as part of a time-based power up or power down operation. The fourth channel designates a hierarchy of channels in that the various defined levels in the hierarchy column are indicative of a desired sequence in which the channels should be enabled or disabled without reference to particular slot values. As such, the hierarchy column can describe the sequence in which the channels should be enabled in a dynamic power-on operation, as described herein.

In various embodiments, PMIC 102, and, specifically, controller 114 of PMIC 102 is configured to implement a time-based power up procedure using the data stored in memory 116. To further illustrate, FIG. 2 is a flowchart depicting method 200 that may be implemented by controller 114 to perform a time-based power up operation.

At block 202, a time-based power up operation is initiated. In one or more embodiments, the time-based power up operation is initiated by a signal typically sent by a main PMIC state machine when transitioning from a power off state to a power on state. The power on operation mode will typically be determined by a one-time programmable bit (OTP) of the PMIC. In an example start-up operation, when a device is powered on, the device initiates a fuse loading process in which a pre-defined device configuration is decode (e.g., from configuration files stored in the memory of the PMIC), where the configuration specifies the default sequences, voltages and modes of operation of the device. Typically, devices can include an input/output pin that can be used (e.g., via application of a particular voltage by an external component) to initiate the power on process at system level. At block 204, controller 114 initializes a slot counter (slot_counter) to a value of 0. At block 202, having initiated slot_counter, controller 114 performs two operations in parallel. At block 206, controller 114 is configured to access the values stored in memory 116 to determine whether any channels are associated with slots having values equal to the current value of slot_counter. If so, controller 114 enables those channels. For example, with reference to Table 1, above, if the current value of slot_counter is "7" then controller 114 would enable the channel "REG3." If the current value of slot_counter is "10" then controller 114 would enable the channels "REG5" and general purpose input/output 1 "GPIO1." If, however, the current value of slot_counter is "9" controller 114 would not enable any channels as part of executing block 206.

While determining which channels to enable based on the current value of slot_counter as part of executing block 206, at block 208 controller 114 is configured to wait for a time period of slot_duration. The length of slot_duration in a typical application may be 30 us, 120 us, 250 us, 500 us, or other durations. Typically, slot durations are determined depending of the timing requirements of the device and timing specifications of the channels being used. The duration of slot_duration is typically selected to enable any channels being enabled in a particular slot to reach their fully regulated voltages before the slot is terminated Once the slot_duration has expired, at block 212 a determination is made as to whether all slots in PMIC 102 have been processed (e.g., a determination of whether the current value of slot_counter equals the total number of slots available in PMIC 102) and/or that all slots are considered powered up (e.g., when all regulators configured to be enabled have been enabled by PMIC 102). If so, method 200 ends. If additional slots remain, the value of slot_counter is incremented at block 214 and the method 200 returns to blocks 206 and 208.

Figure 2:
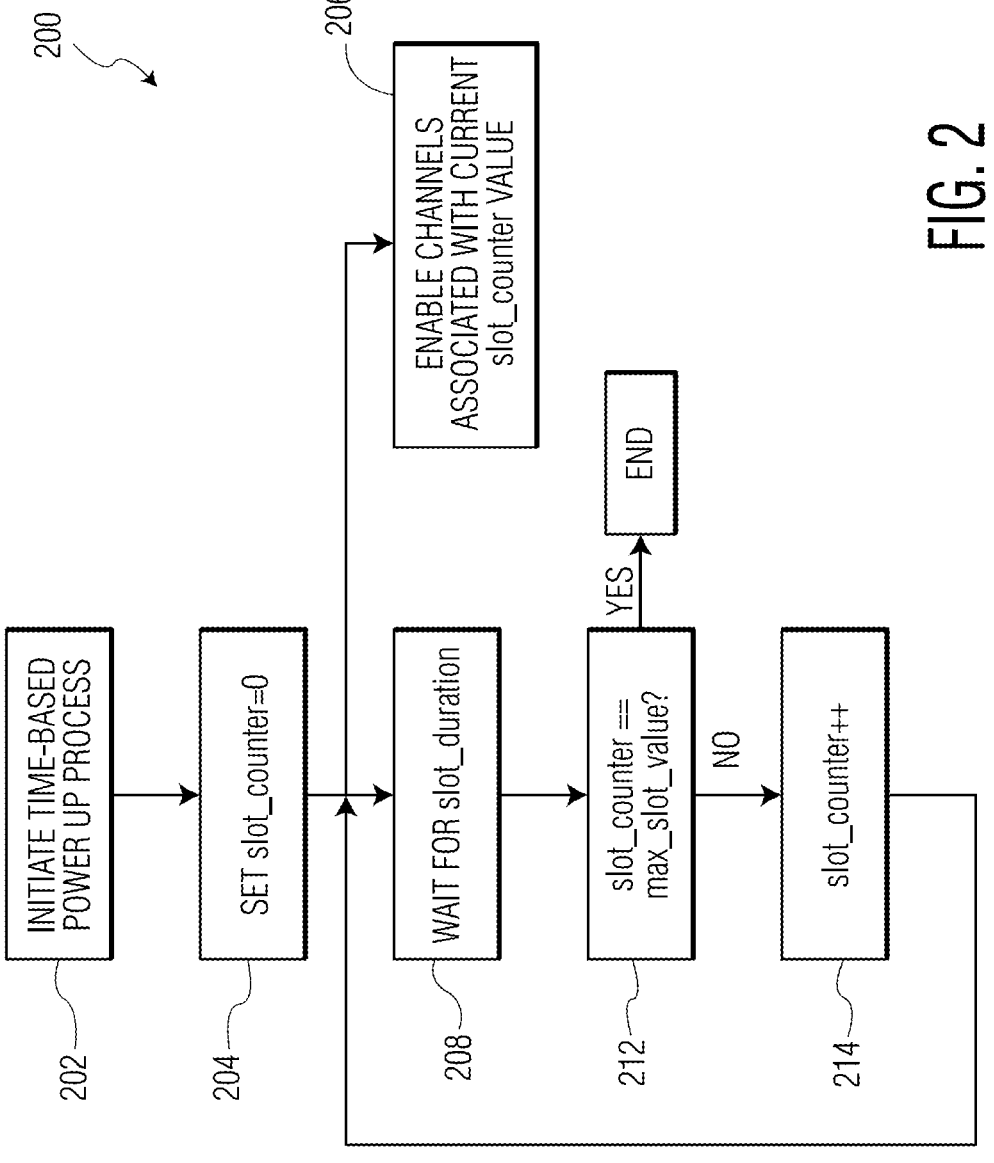
FIG. 2 is a flowchart depicting a method that may be implemented by a controller to perform a time-based power up operation.

Using the method of FIG. 2, by associating the various channels of PMIC 102 with particular slots, and due to the implementation of the predetermined and fixed slot duration (i.e., at block 208 of method 200), it is possible for the sequence and timing at which different channels of PMIC 102 are enabled to be carefully controlled. While this time-based approach provides an approach for precisely specifying the order and sequence in which channels of PMIC 102 are enabled, such an approach can result in system inefficiencies. For example, in many cases, channels may be enabled and reach their regulated voltages in less time than anticipated by the time-based sequence. In that case, other channels could be enabled earlier, but the PMIC 102 must wait until the unused timeslots have passed before further channels can be enabled.

During a time-based power down operation, controller 114 essentially implements method 200 in reverse so that the channels of PMIC 102 are disabled in the opposite order in which they were enabled. One way to implement such an algorithm would be to take the is compliment of all slot values (essential inverting all their values) and identifying the first (i.e., lowest) inverted slot value that is associated with a channel. The slot values can then be inverted again with the first inverted slot value (once inverted) becoming the highest slot value that is associated with a channel. The time-based algorithm of FIG. 2 can then be run in reverse starting at the highest slot value decrementing through all available slot numbers to implement a power off operation. Alternatively, the time-based power down operation may be implemented by inverting all slot values (essentially inverting their order) and performing the method of FIG. 2 in which slots are powered down in block 206 rather than being powered up.

In general, when implementing a power down operation, therefore, the slot_counter would be initiated to the maximum slot number associated with a particular channel in memory 116. That channel would be disabled and controller 114 would decrement the slot_counter value (i.e., at block 214 of FIG. 2) (while implementing the slot_duration delay) until all channels have been disabled.

As discussed above, these time-based approaches allow for precise control over the timing and sequence with which particular channels within PMIC 102 are enabled or disabled. But these sequences are fixed and, as such, can result in efficiencies where a particular channel could be enabled, but controller 114 must wait until unused slots have expired and been incremented through before PMIC 102 can initiate enablement of that channel.

An alternate, and potentially more efficient, approach for implementing a device 100 power up process is a dynamic approach. A dynamic approach involves enabling channels in a predetermined order, but in which channels are enabled as quickly as possible after an earlier channel in the power up sequence has been enabled and has reached its regulated voltage.

Figure 3:
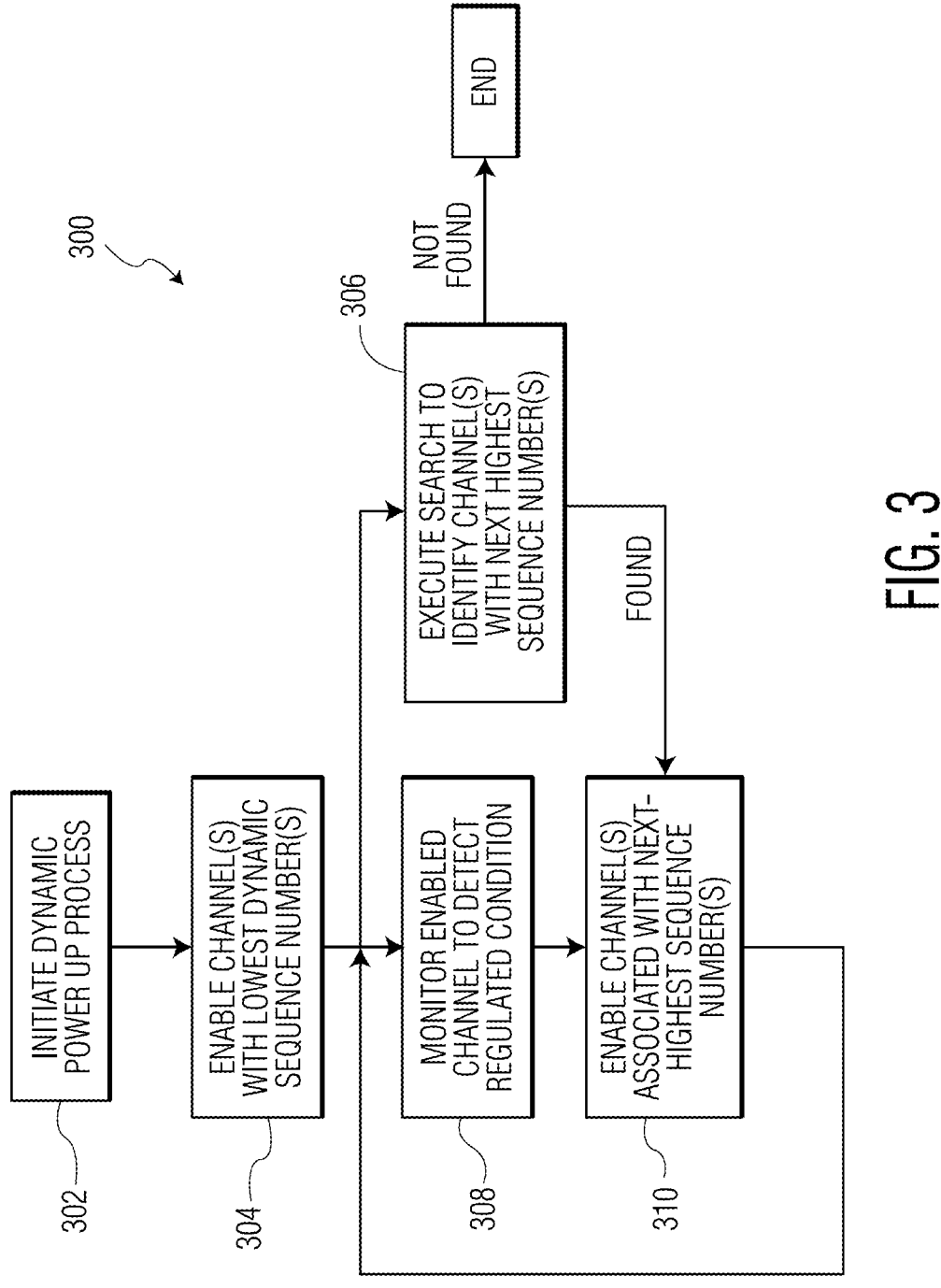
FIG. 3 is a flowchart depicting a method that may be implemented by a controller to perform a dynamic power up operation of a device.

FIG. 3 is a flowchart depicting method 300 that may be implemented by controller 114 to perform a dynamic power up operation of device 100. At block 302, a dynamic power up operation is initiated. In one or more embodiments, the dynamic power up operation is initiated by a signal typically sent by a main PMIC state machine when transitioning from an off state to an on state. The powerup mode will typically be determined by a one-time programmable bit (OTP) of the PMIC. In an example start-up operation, a device is powered for the first time. A pre-defined configuration is decoded, where the configuration specifies the default sequences, voltages and modes of operation of the device. Devices can include an input/output pin that can be used (e.g., via application of a particular voltage) to initiate the power up event at system level. At block 304, controller 114 is configured to access memory 116 to determine which of PMIC 102's channels have the lowest dynamic sequence number indicating that channel (or channels) should be enabled. In the example of Table 1, above, this would correspond to the channels "REG1" and "GPIO2." After enabling those channels, controller 114 performs two operations in parallel. At block 306, controller 114 is configured to execute a search of memory 116 to determine which channels have the next-highest sequence values. In various embodiments, this may involve controller 114 executing a binary search of all dynamic sequence numbers in the table of memory 116 to determine the next sequence number that is associated with a channel that hasn't been enabled yet.

If, at block 206, no additional channels were identified, method 200 ends. However, if channels were found they are identified and provided as input to block 310, described below.

In parallel, at block 308, controller 114 is configured to monitor the channels that were enabled in the preceding block (either block 304 or block 310, described below) to determine whether those enabled channels have reached their respective regulated conditions.

Once the enabled channels have reached their regulated condition, at block 310, controller 114 is configured to enable the new channels that were identified at block 206.

With those new channels enabled, method 200 returns to blocks 308 and 306 to both monitor the newly enabled channels and to identify any further channels to be enabled.

Figure 4:
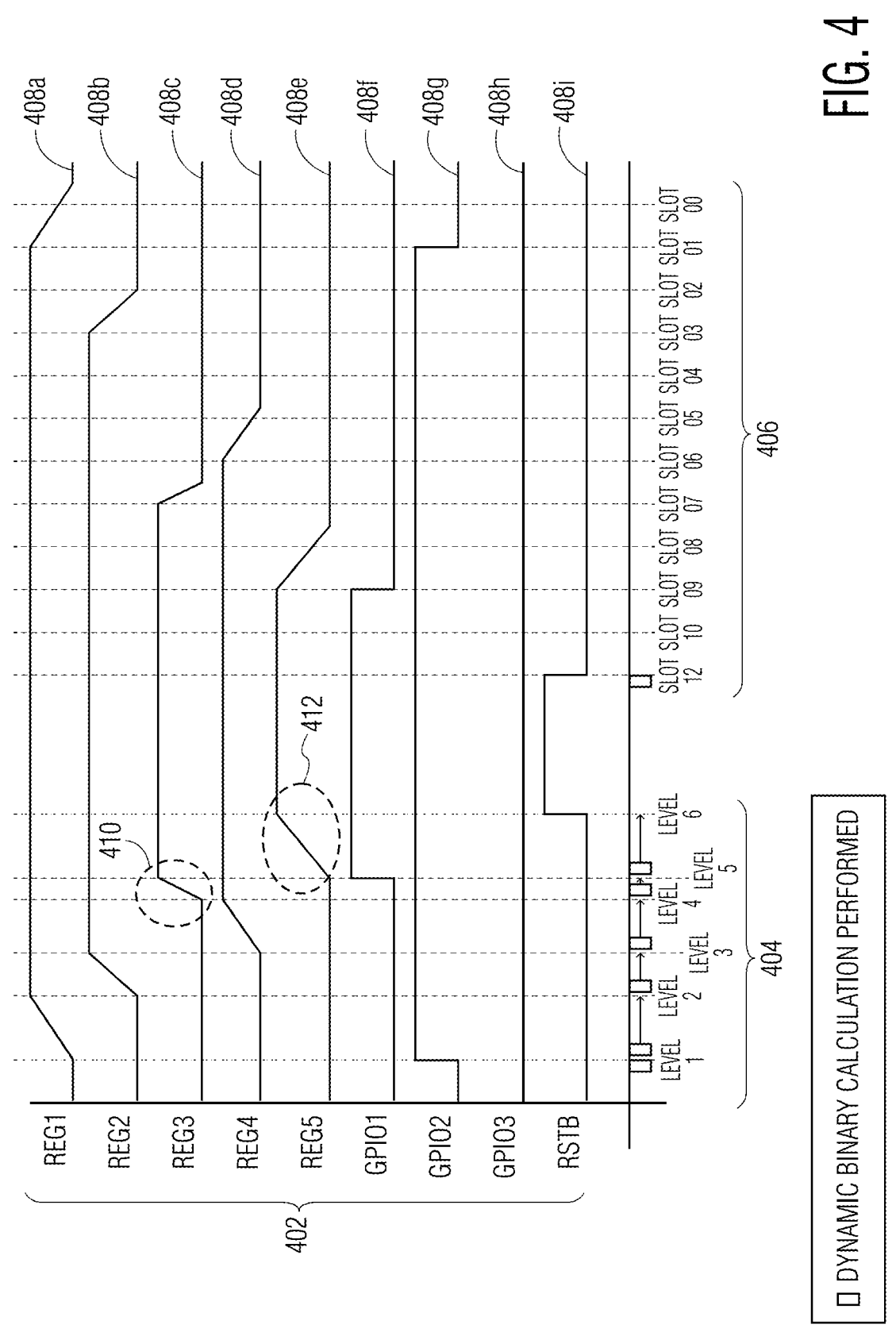
FIG. 4 is a diagram depicting how channels may be enabled according to the present dynamic sequencing approach.

As illustrated by the flow chart of FIG. 3, therefore, in the dynamic approach, new channels in the power sequence are identified (i.e., at block 206) as quickly as possible and are enabled after the preceding channels have reached their respective regulated conditions. As such, method 200 does not impose fixed time delays between channel enablement as was observed in the time-based power up procedure depicted in the flowchart of FIG. 2. This dynamic approach can be beneficial because it can be difficult to predict precisely how long a particular channel will take to reach regulation, which means that many power on sequences are conservative and implement large delays between channel being enabled. The variance in channel start-up time can be attributable to many factors includes system malfunctions/errors, and process, voltage, and temperature variations affecting voltage ramp-up times FIG. 4 is a diagram depicting how channels may be enabled according to the present dynamic sequencing approach in an example PMIC (e.g., PMIC 102 of FIG. 1). In FIG. 4, a number of traces 408 depict the condition of various channels 402 within PMIC 102. The horizontal axis represents time. Note that these channels and their specific power up and power down sequences correspond to the listing in Table 1, above. On the horizontal axis, region 404 represents a portion of the timeline representing the power-up sequence, while region 406 represents the power down sequence.

In FIG. 4, each channel is associated with a particular trace (traces 408a-408i). When the traces 408 have a low value, that indicates the corresponding channel is in a disabled state and when the traces 408 have a high value that indicates the corresponding channel is in an enabled state. The slope of the trace 408 between the trace's high and low conditions is indicative of how long it takes that particular channel to be fully enabled and in a regulated condition or, conversely, how long it takes that channel to be fully disabled and discharged.

As depicted in FIG. 4, during the power on process (designated by region 404), a dynamic approach to channel sequencing is utilized (e.g., in accordance with method 300 of FIG. 3). As illustrated by traces 408a and 408g, channels REG1 and GPIO2 are the first channels enabled as part of the power on process (designated by region 404) (due to their respective sequence numbers in Table 1, above). When those channels have been fully enabled and reached their regulated condition, channel REG2 is enabled (see trace 408b). This process continues until all channels with specific sequence numbers have been enabled in the sequence as specified in Table 1, above.

With reference to the various traces of FIG. 4, it is apparent that the various channels require a different amount of time to be enabled. For example, channel REG3 transitions from its non-enabled state to its fully enabled state very quickly as indicated by the slope of trace 408c at region 410. The various IO channels can be enabled even quicker as indicated by the step changes in their respective traces 408. In contrast, the channel REG5 requires much more time to be fully enabled as indicated by the flatter slope in its trace 408e at region 412.

The dynamic algorithm, as discussed above with respect to method 300, is therefore configured to account for the differences in time required to enable different channels by monitoring each enabled channel to detect when the channel has reached it regulated condition. Once controller 114 of PMIC 102 determines the channel is regulated, the next channels in the sequence can then be enabled as quickly as possible.

In contrast to the dynamic approach utilized to perform the power up operation (e.g., designated by region 404), in the power down operation (i.e., region 406) PMIC 102 is configured to utilize a fixed time-based approach. This may be preferable because, due to the low voltages involved, it can be difficult to monitor a particular channel to determine when the channel is fully disabled, for example. Consequently, a dynamic approach may not be suited to power down operations. As such, and as reflected in FIG. 4, PMIC 102 is configured to implement a time-based approach for disabling channels in a power down operation. According to the sequence set forth by the third column of Table 1, above, channels can be disabled in the reverse order in which they were originally enabled. In that case, the slot assignments associated with each channel (in combination with the process by which PMIC 102 decrements the current slot value) are selected to implement adequate delays to ensure that channels in the sequence are fully disabled before later channels in the sequence are disabled. This is reflected in region 406 of FIG. 4 in which the timeline transitions through each available slot number as part of the power down operation.

During operations of PMIC 102, memory 116, as described above, is configured to store control values in one or more memory registers that are associated with particular sequence values. Memory 116 may also store, for each available channel an indication of whether that channel is in an enabled or disable state. During operation of PMIC 102 (and the larger device 100 overall), these various values can be dynamically updated at any time via appropriate control signals transmitted by controller 114 to memory 116. Typically, however, any such modifications to these values will occur at times that fall outside of an active power transition sequence (e.g., a power on or power down sequence).

Consequently, memory 116 and any registers therein may include terminals configured to receive signals (e.g., from controller 114) that are indicative of a power up or power down state transition, as well as signals that may be configured to cause PMIC 102 to implement an instant shutdown procedure in which all device regulators are disabled at the same time (e.g., in the event of a serious device fault or thermal issue). Such an instant shutdown procedure may be triggered in the event that safety controllers of device 100 (not shown) determine that such a shutdown is required.

In various configurations, PMIC 102 is configured to operate in several different power transition states, including power up, standby transition, run transition, and power down. Operations in each state may involve PMIC 102, as described herein, implementing a sequencing operation to bring all channels online.

In general, the operations of PMIC 102 are controlled according to a finite state machine that is configured to transition PMIC 102 between its various modes of operation (e.g., idle, power up operations, power down operations, power state transition operations). Initially, depending on the selected mode, a power up operation with be implemented in either a time-based power up operation (e.g., in accordance with the method of FIG. 2) or a dynamic power up operation (e.g., in accordance with the method of FIG. 3). In some embodiments, the determination of whether to implement dynamic or time-based start-up operations may be made by modifying a status of a customer-configurable one-time programmable (OTP) bit.

Figure 5:
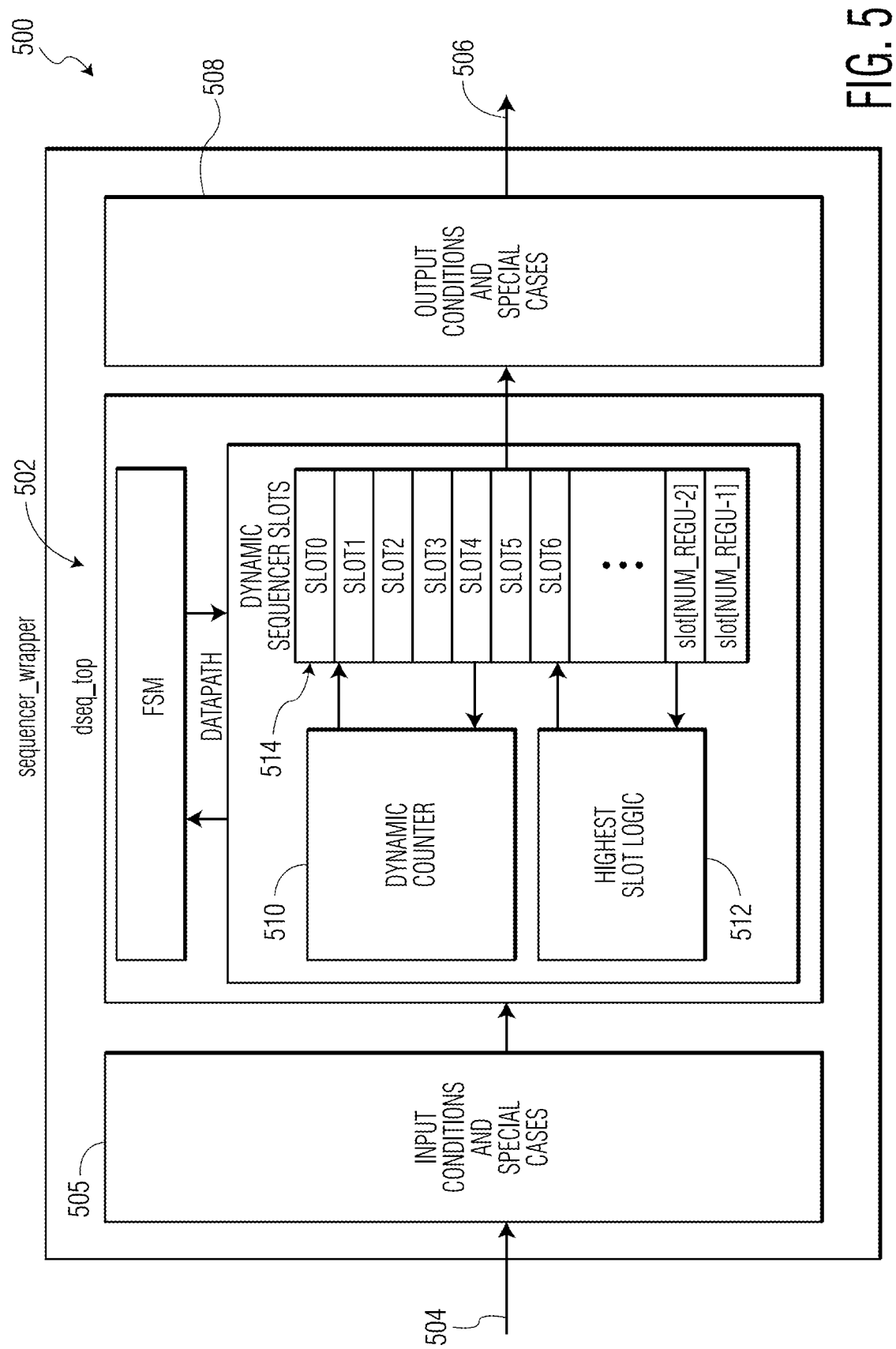
FIG. 5 is a block diagram depicting functional components of a controller configured to perform the time-based and dynamic power up and power down operations of the present disclosure.

FIG. 5 is a block diagram depicting functional components of a controller (e.g., controller 114 of FIG. 1) configured to perform the time-based and dynamic power up and power down operations of the present disclosure.

Controller 500 includes a central core 502 configured to implement the functionality of controller 500. Controller 500 also includes an input terminal 504 configured to receive an input terminal that can be passed through an input signal filter 505 configured to process the input signal (e.g., via a set of special functions or other filters and processors) to generate an input signal useable by central core 502. Similarly, controller 500 includes output terminal 506 configured to generate an output signal of controller 500. Output terminal 506 is connected to an output signal filter 508 configured to process the output signal (e.g., via a set of special functions or other filters and processors) before the signal is output at output terminal 506.

Central core 502 includes dynamic counter 510, which is configured to dynamically identify a sequence of channels within the PMIC (e.g., PMIC 102 of FIG. 1) that can be enabled, for example, by implementing block 306 of FIG. 3. Central core 502 includes a highest slot logic function 512, which is configured to identify the highest slot number in a PMIC that is associated with an enabled channel. As such, highest slot logic function 512 may be utilized by a PMIC controller as part of its power down operation to implement, for example, to identify a first slot number (i.e., the greatest slot number associated with an active channel) at which to begin a time-based power down operation.

Both dynamic counter 510 and highest slot logic function 512 are connected to bank of registers 514 (e.g., contained with a memory such as memory 116 of FIG. 1), which identifies, for each available slot in a PMIC, whether that slot is associated with an enabled or disabled channel, or whether the slot is unused (and in dynamic operations can, therefore, be skipped).

Figure 6:
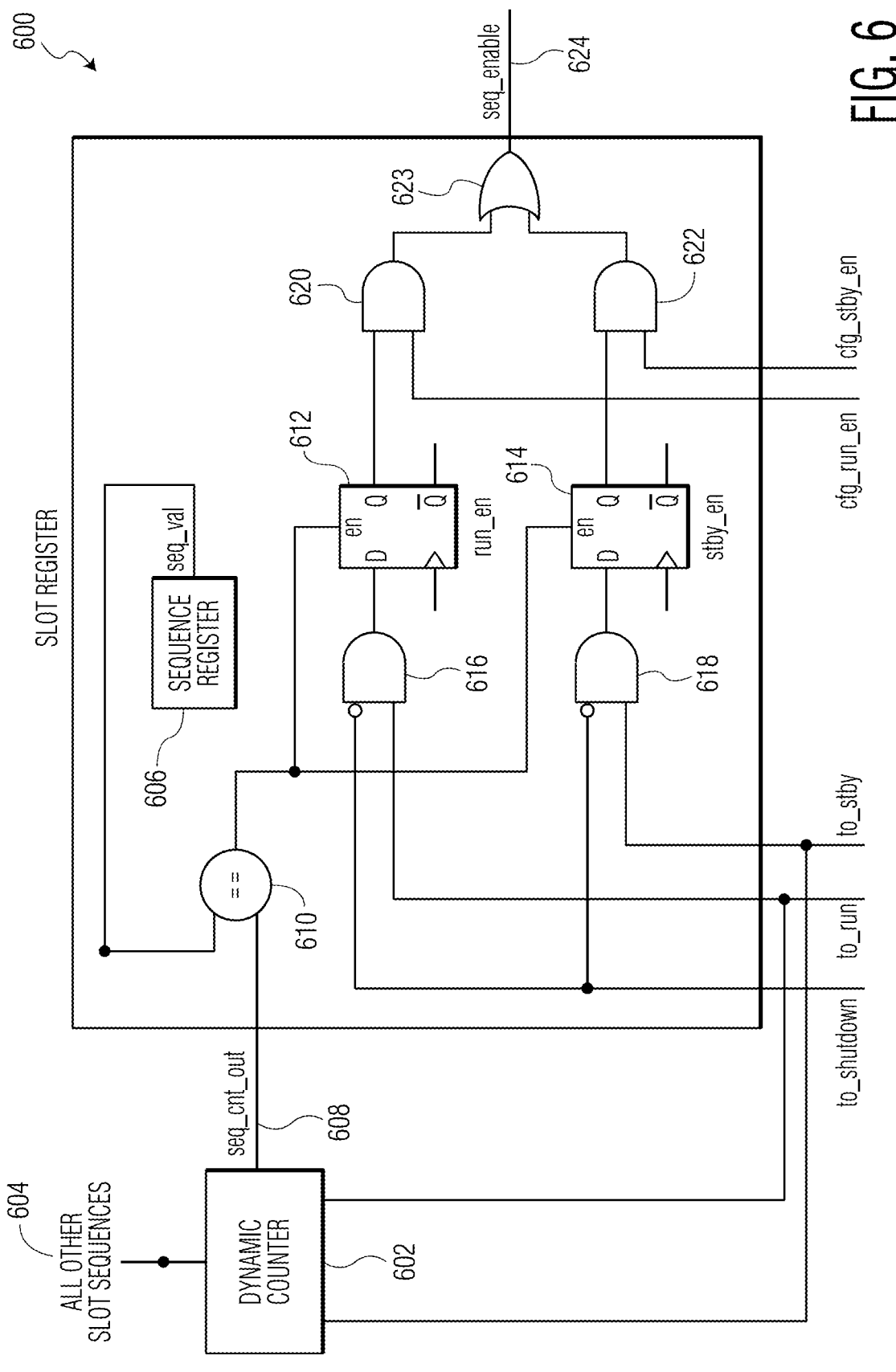
FIG. 6 is a circuit diagram depicting a system configured to selectively enable and/or disable channels of a PMIC in accordance with a dynamic power up operation.

FIG. 6 is a circuit diagram depicting a system configured to selectively enable and/or disable channels of a PMIC in accordance with the present disclosure in a dynamic power up operation. System 600 includes a dynamic counter 602 configured to implement all or a portion of a dynamic power up operation. Dynamic counter 602 is configured to receive, as input, a set of available sequence numbers 604. Dynamic counter 602 is configured to increment through the set of available sequence numbers and output their values at output terminal 608 which is connected to a first input terminal of comparator 610. At the same time, sequence register 606 is configured to output a set of assigned sequence numbers to a second terminal of comparator 610. When an assigned sequence number is equal to the current sequence number output at terminal 608 of dynamic counter 602, the output of comparator goes high.

That output signal is provided to the enable control terminals of latches 612 and 614. Latch 612, when the input at its enable control terminal is high (i.e., the output of comparator 610 is a high value) is configured to generate an output at its non-inverting output terminal (Q) that is equal to the output of AND gate 616. AND gate 616 is configured to generate a high output value when the value of the to_shutdown pin is a low value (which is inverted prior to being provided to a first input terminal of AND gate 616) and the value of the to_run pin is a high value. As such, latch 612 generates a high output value when the channel associated with the current sequence number should be powered on and a low value when the channels associated with the current sequence number should be powered down.

In latch 612, when the input at its enable control terminal is high (i.e., the output of comparator 610 is a high value) is configured to generate an output at its non-inverting output terminal (Q) that is equal to the output of AND gate 618. AND gate 618 is configured to generate a high output value when the value of the to_shutdown pin is a low value (which is inverted prior to being provided to a first input terminal of AND gate 616) and the value of to_stby is a high value. As such, latch 612 generates a high output value when the channel associated with the current sequence number should be put into standby mode and a low value when the channels associated with the current sequence number should be powered down.

The output of latch 612 is provided as an input to AND gate 620, which generates a high output when the output of latch 612 is a high value and the cfg_run_en value is high (indicating that the dynamic sequence operation is being run).

The output of latch 614 is provided as an input to AND gate 622, which generates a high output when the output of latch 614 is a high value and the cfg_stby_en value is high (indicating that the dynamic sequence operation is being run to put channels into standby mode).

The outputs of AND gates 620 and 622 are provided to OR gate 623. As such, when either the output of AND gate 620 or AND gate 622 goes high, system 600 generates an output signal seq_enable at output terminal 624.

Referring back to FIG. 1, after device 100 is fully powered up (either by PMIC 102 implementing a time-based power up operation or a dynamic power up operation), future transitions between states will typically trigger time-based operations, such as involving a power down operation or a transition to a standby mode or some other power state.

When the PMIC moves to a shutdown state, the controller can begin its own shutdown operation. The largest programmed slot (i.e., the highest slot number that is associated with a channel of PMIC) is computed and will be the starting point for the power down sequence. The sequencer will then begin a timing-based sequencing operation counting down from its start point. Once the process reaches the last slot (i.e., the slot numbered 0), a configurable shutdown delay can occur. The sequencer can also be configured to wait for some subset of regulators to complete their ramp down. Once these two delay conditions are met, the controller can indicate it has successfully powered down and return to its idle state.

To implement the dynamic power up operation, controller 114 of PMIC 102 includes a dynamic counter subsystem that may be configured to operate in two modes of operation on power up: static and dynamic. If set to static mode, the dynamic counter is configured to begin counting up one slot number at a time (e.g., by iterating, over time, through the set of available slot numbers in accordance with the method of FIG. 2) with a programmed delay between each iteration of slot value. If, for a particular slot value, memory 116 stores configuration data indicating that a particular channel or set of channels should be enabled for a particular slot value, when the counter's current slot value matches that slot number, that channel or set of channels can be enabled. In such a time-based power up operation, no slot values are skipped and the power up operation will iterate through all slot numbers in sequence. The power up operation one all slot values have been processed.

If, however, the counter is set to dynamic mode, the counter will begin by skipping to the lowest slot. Once reached, the enable bit for that slot will be set and the counter will begin to count utilizing any possible skipping (e.g., in accordance with the method of FIG. 3). This counting can continue until the next lowest slot is reached and counting will be paused until the channel associated with the current slot are confirmed to be successfully powered up and regulated. This process repeat until either a failure occurs, or all slots have been successfully powered up.

In its dynamic mode, the dynamic counter is configured to determine the sequence in which channels are enabled according to the pre-defined sequence numbers. Specifically, while a power-on operation is on-going, the dynamic counter is configured to identify the next-highest sequence number in the set of defined sequence numbers (e.g., as in Table 1, above). The dynamic counter may be configured to implement sequence number skips by rounding up remaining sequence numbers to the nearest multiple of some power of two. In some embodiments, an XOR logic network can be implemented to determine which bits differ between the current count value and remaining sequence numbers in the channel power-on sequence (e.g., in Table 1, above) For each sequence number associated with a channel that is not yet powered up, it is possible to determine which multiples of powers of 2 can be safely rounded up to without passing over that slot.

For example, when navigating through sequence numbers, which may be 6-bit numbers, the determination of the next sequence number in the overall set of sequence numbers may be made by comparing a subset of the bits of sequence numbers, for example, rounding up various bits (e.g., bits 5, 4, 3, etc. of the sequence numbers) corresponding to rounding up to the nearest multiple of 32, 16, 8, etc. These "safe rounding" version of the sequence numbers can then be compared to each other and the largest non-enabled "safe round" version of the sequence numbers is used to determine the next sequence numbers. For example, if, during a power-on operation, two non-enabled channels remain, and the bit differences between their respective sequence numbers are at bits 4 and 5, the most-significant bits of both sequence numbers (e.g., bits 1, 2, 3, and 4) are the same and may not be compared to determine which sequence number is next in sequence. As such the dynamic counter can determine which of the two remaining sequence numbers are next by only comparing bits 4 and 5. As such, for each $2^n$ sequence number value where n is less than the number of bits in the sequence value, it can be safe to round up to the next multiple of $2^n$ if there exists a bit difference somewhere between the nth bit and the most significant bit. The safe rounding targets for each slot are compared, and the final rounding target will be the largest power of two deemed safe to round up to by all remaining slots. The counter will be rounded to that value and the process will be repeated until an occupied slot is reached. When the counter is given an initial value of 0, this process guarantees no unpowered slots will be passed over when the counter is rounded up.

In other words, when determining the next sequence number out of a set of sequence numbers, bit positions in the sequence numbers that are the same across all sequence numbers do not need to be compared to determine the next-highest sequence numbers. To illustrate, if the sequence numbers in a particular PMIC are defined by 8-bit values the maximum possible sequence number is 255 (in decimal). If, however, the corresponding PMIC is only configured to use a total of 127 (in decimal) slots, then the first bit (i.e., the most significant bit) of the 8-bit sequence numbers will always have a value of '0'). As such, in determining the next sequence number, the MSB of the sequence numbers in that case can be ignored.

In various embodiments of PMIC 102, and, specifically, its dynamic counter components, this algorithm can also be used for finding the dynamic starting point of the lowest possible slot number that may be utilized in a power down sequence. In that case, the largest slot numbers that is associated with a particular PMIC 102 channel can be determined by setting the initial counter value to 0 and performing the algorithm on the inverse of each slot value. Once this value is reached, it is loaded into the counter, which begins the simple count-down sequencing. In various embodiments, this approach allows for a faster counting than a simple increment, while avoiding the large area cost of a direct skip. Since this counting also takes place in parallel to the ramp up of a slot, it is effectively hidden by the much longer ramp-up time of a voltage regulator. The $O(\log(n))$ search time allows for efficient scaling for larger slot values.

In some aspects, the techniques described herein relate to a power management integrated circuit, including: a power supply input terminal; a plurality of power supply output terminals, wherein each power supply output terminal in the power supply output terminals is associated with a channel of a plurality of channels; a memory configured to store configuration data that identifies, for each channel in the plurality of channels, a slot number of a plurality of slot numbers and a dynamic sequence number of a plurality of dynamic sequence numbers; and a controller configured to: receive a control input indicating that a power on operation is to be executed; determine, based on a configuration stored in the memory, a power on mode; when the power on mode indicates a dynamic power on operation, execute the dynamic power on operation by: determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, and while monitoring the first channel, determining, of the plurality of channels, a second channel associated with a second dynamic sequence number of the plurality of dynamic sequence numbers, when the power on mode indicates a time based power on operation: iterating a slot counter through the plurality of slot numbers; and when a current value of the slot counter is equal to a slot number associated with a third channel of the plurality of channels in the configuration data, enable the third channel.

In some aspects, the techniques described herein relate to a power management integrated circuit, wherein the controller is configured to, after determining that the first channel is in the first regulated state, enable the second channel.

In some aspects, the techniques described herein relate to a power management integrated circuit, wherein the controller is configured to wait for a predetermined slot duration at each iteration of the slot counter.

In some aspects, the techniques described herein relate to a power management integrated circuit, wherein the controller is configured to determine that the second dynamic sequence number is a next highest dynamic sequence number after the first dynamic sequence number of the plurality of dynamic sequence numbers.

In some aspects, the techniques described herein relate to a power management integrated circuit, wherein the controller is configured to determine that the second dynamic sequence number is the next highest dynamic sequence number by comparing a first subset of binary values in the second dynamic sequence number to a second subset of binary values in the next highest dynamic sequence number.

In some aspects, the techniques described herein relate to a power management integrated circuit, including: a power supply input terminal; a plurality of power supply output terminals, wherein each power supply output terminal in the power supply output terminals is associated with a channel of a plurality of channels; a memory configured to store configuration data that identifies, for each channel in the plurality of channels, a slot number of a plurality of slot numbers and a dynamic sequence number of a plurality of dynamic sequence numbers; and a controller configured to execute a dynamic device power up operation by: determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, while monitoring the first channel, determining, of the plurality of channels, a second channel associated with a second dynamic sequence number of the plurality of dynamic sequence numbers, determining that the first channel is in the first regulated state, and enabling the second channel.

In some aspects, the techniques described herein relate to a power management integrated circuit, wherein the controller is configured to execute a time-based power up operation by: iterating a slot counter through the plurality of slot numbers; and when a current value of the slot counter is equal to a slot number associated with a third channel of the plurality of channels in the configuration data, enable the third channel.

In some aspects, the techniques described herein relate to a power management integrated circuit, wherein the controller is configured to wait for a predetermined slot duration at each iteration of the slot counter.

In some aspects, the techniques described herein relate to a power management integrated circuit, wherein the controller is configured to determine that the second dynamic sequence number is a next highest dynamic sequence number after the first dynamic sequence number of the plurality of dynamic sequence numbers.

In some aspects, the techniques described herein relate to a power management integrated circuit, wherein the controller is configured to determine that the second dynamic sequence number is the next highest dynamic sequence number by comparing a first subset of binary values in the second dynamic sequence number to a second subset of binary values in the next highest dynamic sequence number.

In some aspects, the techniques described herein relate to a power management integrated circuit, wherein the controller is configured to determine the second channel by executing a binary search of the plurality of dynamic sequence numbers.

In some aspects, the techniques described herein relate to a power management integrated circuit, wherein the controller is configured to: determine, of the plurality of channels, a third channel associated with the first dynamic sequence number, and enable the third channel.

In some aspects, the techniques described herein relate to a power management integrated circuit, wherein the controller is configured to enable the third channel while enabling the first channel.

In some aspects, the techniques described herein relate to a power management integrated circuit, wherein the controller is configured to determine that the third channel is in a second regulated state before enabling the second channel.

In some aspects, the techniques described herein relate to a power management integrated circuit, wherein the plurality of channels include at least one general purpose input/output channel.

In some aspects, the techniques described herein relate to a method, including: determining, of a plurality of channels of a power management integrated circuit, a first channel associated with a first dynamic sequence number in a memory of the power management integrated circuit, wherein the first dynamic sequence number is a lowest dynamic sequence number of a plurality of dynamic sequence numbers, enabling the first channel, monitoring the first channel to determine whether the first channel is in a first regulated state that specifies a voltage value, while monitoring the first channel, determining, of the plurality of channels, a second channel associated with a second dynamic sequence number of the plurality of dynamic sequence numbers, determining that the first channel is in the first regulated state, and enabling the second channel.

In some aspects, the techniques described herein relate to a method, further including determining that the second dynamic sequence number is a next highest dynamic sequence number after the first dynamic sequence number of the plurality of dynamic sequence numbers.

In some aspects, the techniques described herein relate to a method, further including determining that the second dynamic sequence number is the next highest dynamic sequence number by comparing a first subset of binary values in the second dynamic sequence number to a second subset of binary values in the next highest dynamic sequence number.

In some aspects, the techniques described herein relate to a method, further including: determining, of the plurality of channels, a third channel associated with the first dynamic sequence number, and enabling the third channel.

In some aspects, the techniques described herein relate to a method, further including enabling the third channel while enabling the first channel. As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM"), a read-only memory ("ROM"), an erasable programmable read-only memory ("EPROM" or flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The block diagrams in the figures illustrate architecture, functionality, and operation of possible implementations of circuitry, systems, methods, processes, and program products according to various embodiments of the present disclosure. In this regard, certain blocks in the block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module, and achieve the stated purpose for the module. Indeed, a module of executable code may be a single instruction, or many instructions, and may even be distributed over several different code segments, among different programs, and across several memory devices. Similarly, operational data (e.g., knowledge bases of adapted weights and/or biases described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general-purpose computer, special purpose computer, or other programmable data processing apparatus (e.g., controller) to produce a machine, such that the instructions, which execute via the processor(s) of the computer or other programmable data processing apparatus, create circuitry or means for implementing the functions/acts specified in the block diagram block or blocks.

It will also be noted that each block of the block diagrams, and combinations of blocks in the block diagrams, can be implemented by special purpose hardware-based systems (e.g., which may include one or more graphics processing units) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, application specific ICs, microcontrollers, systems on a chip, general purpose processors, microprocessors, or the like.

Computer program code, i.e., instructions, for carrying out operations for aspects of the present disclosure may be written in any combination of one or more programming languages, including an object-oriented programming language such as Java, Smalltalk, Python, C++, or the like, conventional procedural programming languages, such as the "C" programming language or similar programming languages.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the functions/acts specified in the block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer, other programmable apparatus, or other devices provide processes for implementing the functions/acts specified in the block diagram block or blocks.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed:

1. A power management integrated circuit, comprising:
a power supply input terminal;
a plurality of power supply output terminals, wherein each power supply output terminal in the power supply output terminals is associated with a channel of a plurality of channels;
a memory configured to store configuration data that identifies, for each channel in the plurality of channels, a slot number of a plurality of slot numbers and a dynamic sequence number of a plurality of dynamic sequence numbers; and
a controller configured to:
receive a control input indicating that a power on operation is to be executed;
determine, based on a configuration stored in the memory, a power on mode;
when the power on mode indicates a dynamic power on operation, execute the dynamic power on operation by:
determining, of the plurality of channels, a first channel associated with a first dynamic sequence number that is a lowest dynamic sequence number of the plurality of dynamic sequence numbers,
enabling the first channel,
monitoring the first channel to determine whether the first channel is in a first regulated state, and
while monitoring the first channel, determining, of the plurality of channels, a second channel associated with a second dynamic sequence number of the plurality of dynamic sequence numbers,
when the power on mode indicates a time based power on operation:
iterating a slot counter through the plurality of slot numbers; and
when a current value of the slot counter is equal to a slot number associated with a third channel of the plurality of channels in the configuration data, enable the third channel.

2. The power management integrated circuit of claim 1, wherein the controller is configured to, after determining that the first channel is in the first regulated state, enable the second channel.

3. The power management integrated circuit of claim 1, wherein the controller is configured to wait for a predetermined slot duration at each iteration of the slot counter.

4. The power management integrated circuit of claim 1, wherein the controller is configured to determine that the second dynamic sequence number is a next highest dynamic sequence number after the first dynamic sequence number of the plurality of dynamic sequence numbers.

5. The power management integrated circuit of claim 4, wherein the controller is configured to determine that the second dynamic sequence number is the next highest dynamic sequence number by comparing a first subset of binary values in the second dynamic sequence number to a second subset of binary values in the next highest dynamic sequence number.

6. A power management integrated circuit, comprising:
a power supply input terminal;
a plurality of power supply output terminals, wherein each power supply output terminal in the power supply output terminals is associated with a channel of a plurality of channels;
a memory configured to store configuration data that identifies, for each channel in the plurality of channels, a slot number of a plurality of slot numbers and a dynamic sequence number of a plurality of dynamic sequence numbers; and
a controller configured to execute a dynamic device power up operation by:
determining, of the plurality of channels, a first channel associated with a first dynamic sequence number that is a lowest dynamic sequence number of the plurality of dynamic sequence numbers, enabling the first channel, monitoring the first channel to determine whether the first channel is in a first regulated state, while monitoring the first channel, determining, of the plurality of channels, a second channel associated with a second dynamic sequence number of the plurality of dynamic sequence numbers, determining that the first channel is in the first regulated state, and enabling the second channel.

7. The power management integrated circuit of claim 6, wherein the controller is configured to execute a time-based power up operation by:

iterating a slot counter through the plurality of slot numbers; and when a current value of the slot counter is equal to a slot number associated with a third channel of the plurality of channels in the configuration data, enable the third channel.

8. The power management integrated circuit of claim 7, wherein the controller is configured to wait for a predetermined slot duration at each iteration of the slot counter.

9. The power management integrated circuit of claim 6, wherein the controller is configured to determine that the second dynamic sequence number is a next highest dynamic sequence number after the first dynamic sequence number of the plurality of dynamic sequence numbers.

10. The power management integrated circuit of claim 9, wherein the controller is configured to determine that the second dynamic sequence number is the next highest dynamic sequence number by comparing a first subset of binary values in the second dynamic sequence number to a second subset of binary values in the next highest dynamic sequence number.

11. The power management integrated circuit of claim 9, wherein the controller is configured to determine the second channel by executing a binary search of the plurality of dynamic sequence numbers.

12. The power management integrated circuit of claim 6, wherein the controller is configured to:

determine, of the plurality of channels, a third channel associated with the first dynamic sequence number, and enable the third channel.

13. The power management integrated circuit of claim 12, wherein the controller is configured to enable the third channel while enabling the first channel.

14. The power management integrated circuit of claim 12, wherein the controller is configured to determine that the third channel is in a second regulated state before enabling the second channel.

15. The power management integrated circuit of claim 6, wherein the plurality of channels include at least one general purpose input/output channel.

16. A method, comprising:

determining, of a plurality of channels of a power management integrated circuit, a first channel associated with a first dynamic sequence number in a memory of the power management integrated circuit, wherein the first dynamic sequence number is a lowest dynamic sequence number of a plurality of dynamic sequence numbers, enabling the first channel, monitoring the first channel to determine whether the first channel is in a first regulated state that specifies a voltage value, while monitoring the first channel, determining, of the plurality of channels, a second channel associated with a second dynamic sequence number of the plurality of dynamic sequence numbers, determining that the first channel is in the first regulated state, and enabling the second channel.

17. The method of claim 16, further comprising determining that the second dynamic sequence number is a next highest dynamic sequence number after the first dynamic sequence number of the plurality of dynamic sequence numbers.

18. The method of claim 17, further comprising determining that the second dynamic sequence number is the next highest dynamic sequence number by comparing a first subset of binary values in the second dynamic sequence number to a second subset of binary values in the next highest dynamic sequence number.

19. The method of claim 16, further comprising:

determining, of the plurality of channels, a third channel associated with the first dynamic sequence number, and enabling the third channel.

20. The method of claim 19, further comprising enabling the third channel while enabling the first channel.

* * * * *